United States Patent

[11] 3,604,399

| [72] | Inventor | William R. Mills<br>2808 Warren Way, Arcadia, Calif. 91006 |
|---|---|---|
| [21] | Appl. No. | 814,480 |
| [22] | Filed | Jan. 15, 1969 |
| [45] | Patented | Sept. 14, 1971<br>Continuation-in-part of application Ser. No. 741,583, July 1, 1968, now abandoned. |

[54] ANIMAL RACE STARTING APPARATUS
10 Claims, 8 Drawing Figs.

| [52] | U.S. Cl. | 119/15.5 |
|---|---|---|
| [51] | Int. Cl. | A63k 13/00, A63k 03/02 |
| [50] | Field of Search | 119/15.5 |

[56] References Cited
UNITED STATES PATENTS

| 2,868,168 | 1/1959 | Dunn | 119/15.5 |
|---|---|---|---|
| 2,888,904 | 6/1959 | Purcell | 119/15.5 |
| 2,955,570 | 10/1960 | Purcell | 119/15.5 |

*Primary Examiner*—Aldrich F. Medbery
*Attorney*—Daniel T. Anderson

ABSTRACT: A starting gate apparatus for racing horses which includes a flexible, tread-producing, nonslip mat upon which the horses stand at the time of their initial forward thrust or takeoff. The system shown includes mechanisms for automatically and quickly lifting the traction mat covering the stall area over the track off the ground when it is desired to move the starting gate away from the starting location.

WILLIAM R. MILLS
INVENTOR.

BY Daniel T. Anderson
ATTORNEY

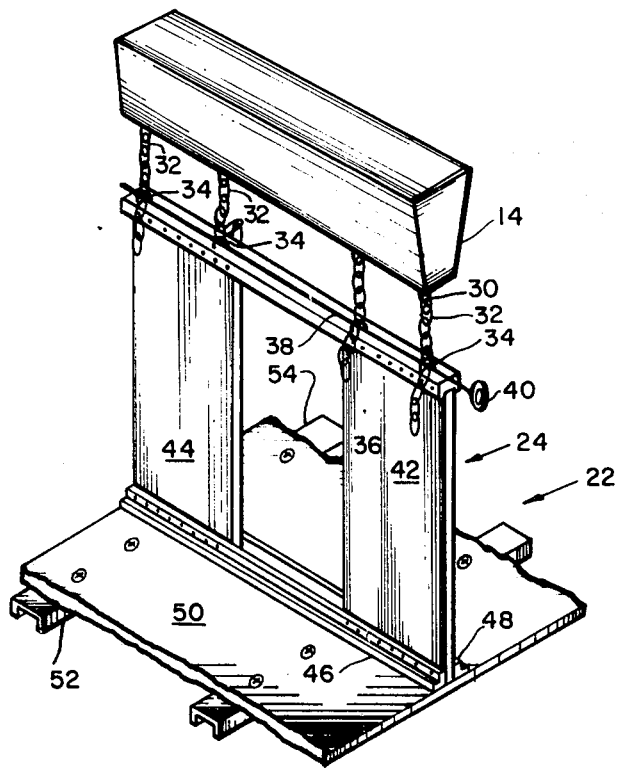
Fig.2
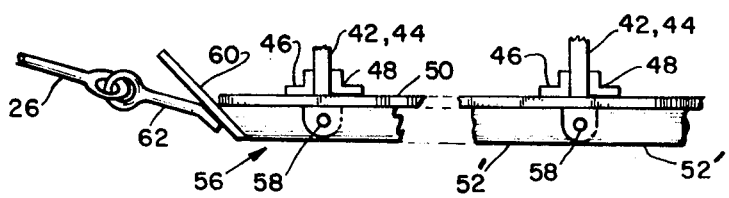
Fig.3
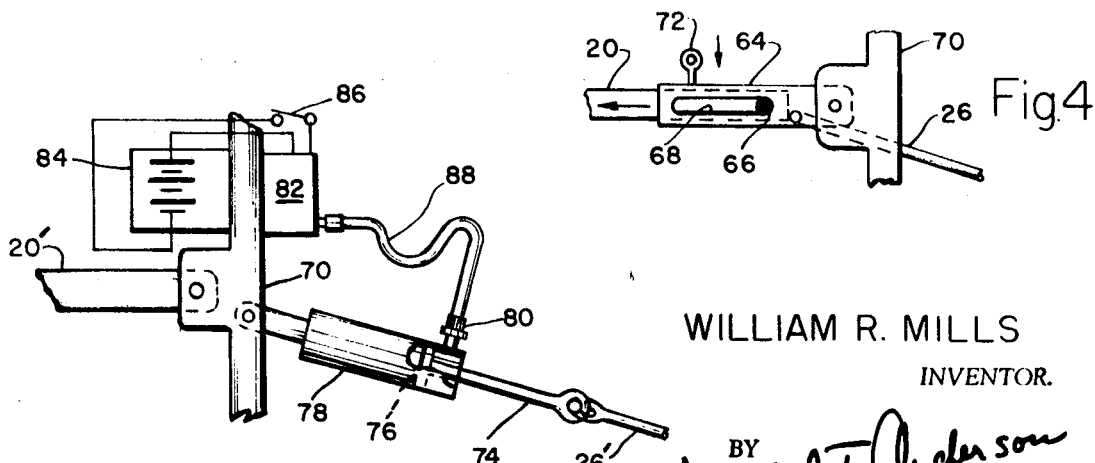
Fig.4
Fig.5
WILLIAM R. MILLS
INVENTOR.
BY Daniel T. Anderson
ATTORNEY

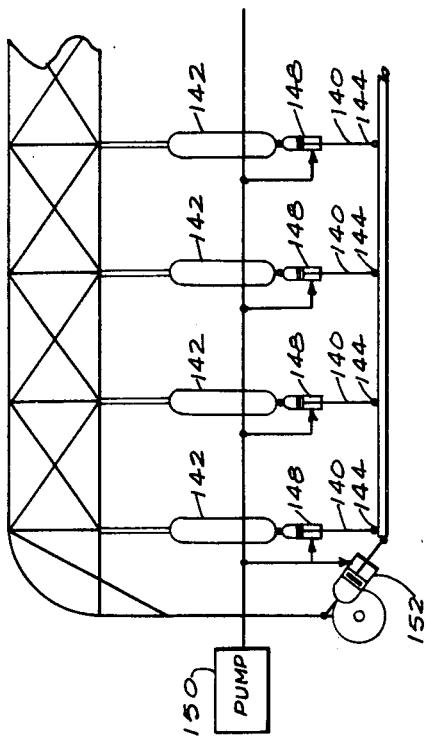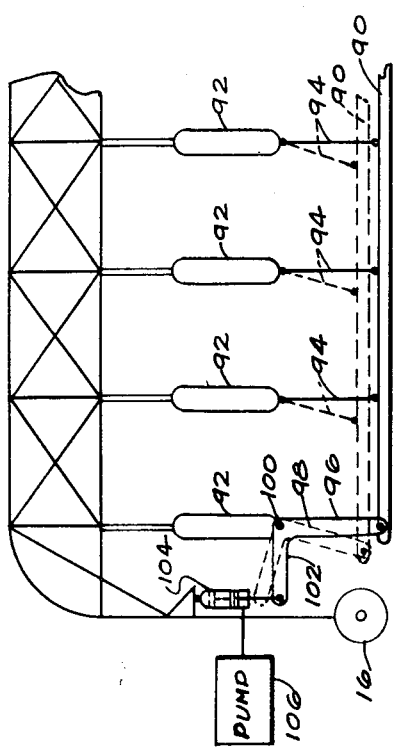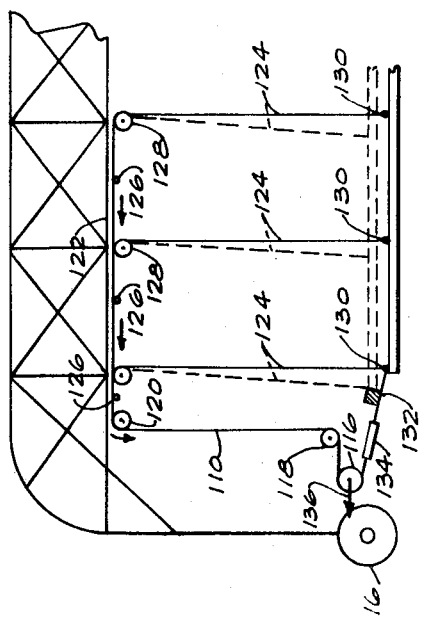

ANIMAL RACE STARTING APPARATUS

The application is a continuation-in-part of copending application Ser. No. 741,583, filed July 1, 1968 and now abandoned for ANIMAL RACING APPARATUS.

BACKGROUND OF INVENTION

1. Field of the Invention

This invention relates generally to animal racing starting apparatus and more particularly to horseracing starting gates and improvements therein.

Although the invention finds particularly advantageous application in the field of horseracing on soil tracks and although, in the cause of brevity and clarity of presentation, much of the following description and discussion of examples of the invention relate particularly thereto; it is expressly to be understood that the advantages of the invention are equally well manifest in other branches of racing such as, for example, racing on turf, racing of other heavy animals, and the like.

2. Discussion of the Prior Art

With particular reference, therefore, to earth track horseracing, it occasionally occurs that as the horse in the starting gate is released and it jumps forwardly to begin the race, its rear feet break ground and are thrust rearwardly against starting gate structure. This occurrence is not unusual and its deleterious effects are readily apparent; the horse may be painfully injured and/or frightened; a valuable property may be injured in a manner seriously damaging to its race-winning potential; the rider may be injured in an ensuing fall; the instant race may be fortuitously won by a slower horse that did not happen to break ground during its start.

There have been a number of approaches in the prior art toward solution of this and related problems; however, each has resulted in, at best, devices constituting only a partial solution. In some of the known prior art devices, for example, a padded kick bar is provided at the rear of the gate enclosure for minimizing the risk of injury to the horse's feet and legs if the hoof should break ground in its takeoff thrust. Clearly, however, the padded kick bar can still permit injury to the horse, a fall or entanglement, fright in the horse, and an ineffectual or at least disadvantageous start for the horse.

Other prior art attempts have resulted in devices which similarly do not fully provide a solution or are so massive, complex, costly, unreliable, not adequately quickly mobile, or noisy when in use, as to have failed in achieving any significant degree of acceptance by race track managements.

Accordingly, it is an object of the present invention to provide improved, animal racing apparatus which is not subject to these and other disadvantages and limitations of the prior art.

It is another object to provide such apparatus which substantially eliminates unequal and inaccurate racing starts due to the animal's foot slipping or breaking ground on initial thrust.

It is another object to provide such apparatus which may be removed from the race start area substantially immediately after the race start.

It is another object to provide such apparatus which does not require accurately flat and smooth track surface in the race start area.

It is another object to provide such apparatus which may be essentially dismantled instantly to release an animal from any entanglement with the starting gate system.

It is another object to provide such a system which substantially reduces the risk of any injury to animal or rider and which as a system is exceedingly versatile and adaptable to existing starting gate structures.

It is another object to provide such a system which is mechanically rugged and simple and which, while being totally reliable and easy to operate by unskilled persons, is inexpensive to manufacture and install for use.

SUMMARY OF INVENTION

Very briefly, these and other objects are achieved in one example of the invention which includes a horserace starting gate having a plurality of horse-retaining stalls and being, in several fundamental respects, substantially conventional in the construction of its superstructure and mobile supporting structure.

A heavy rubberlike mat, which may be reinforced by frame members is suspended from the several stall divider structures by tension-supporting apparatus. In this example, the tension supporting members are affixed between an upper header and the mat. The header in turn may be affixed by adjustable length and quick-release means to the stall divider structures.

Mat-retracting means is provided which lifts the mat structure and, in one example, lifts by pulling it longitudinally in a parallelogram swing manner from its support points on the divider structures. The longitudinal swing displacement of several inches results in a lifting of a few inches of the mat from the ground and thus provides clearance therefrom for moving the entire start gate assembly from the track when desired.

Further details of these and other novel features and their operation including alternative combinations for retracting the mat and means for permitting the mat to conform to uneven ground, as well as additional objects and advantages of the invention will become apparent and be best understood from a consideration of the following description when taken in connection with the accompanying drawings which are presented by way of illustrative example only.

BRIEF DESCRIPTION OF DRAWINGS

FIG. 2 is a more detailed perspective view of a broken-away portion thereof;

FIG. 3 is an elevational view of a portion of the mat and retracting mechanism of the structure of FIG. 1;

FIG. 4 is an elevational view of the actuating portion of one form of the retracting mechanism;

FIG. 5 is a like view of an alternative form thereof; and

FIGS. 6, 7, and 8 are schematic, simplified views of alternative examples of the invention.

DESCRIPTION OF PREFERRED EMBODIMENTS

Figure 1:
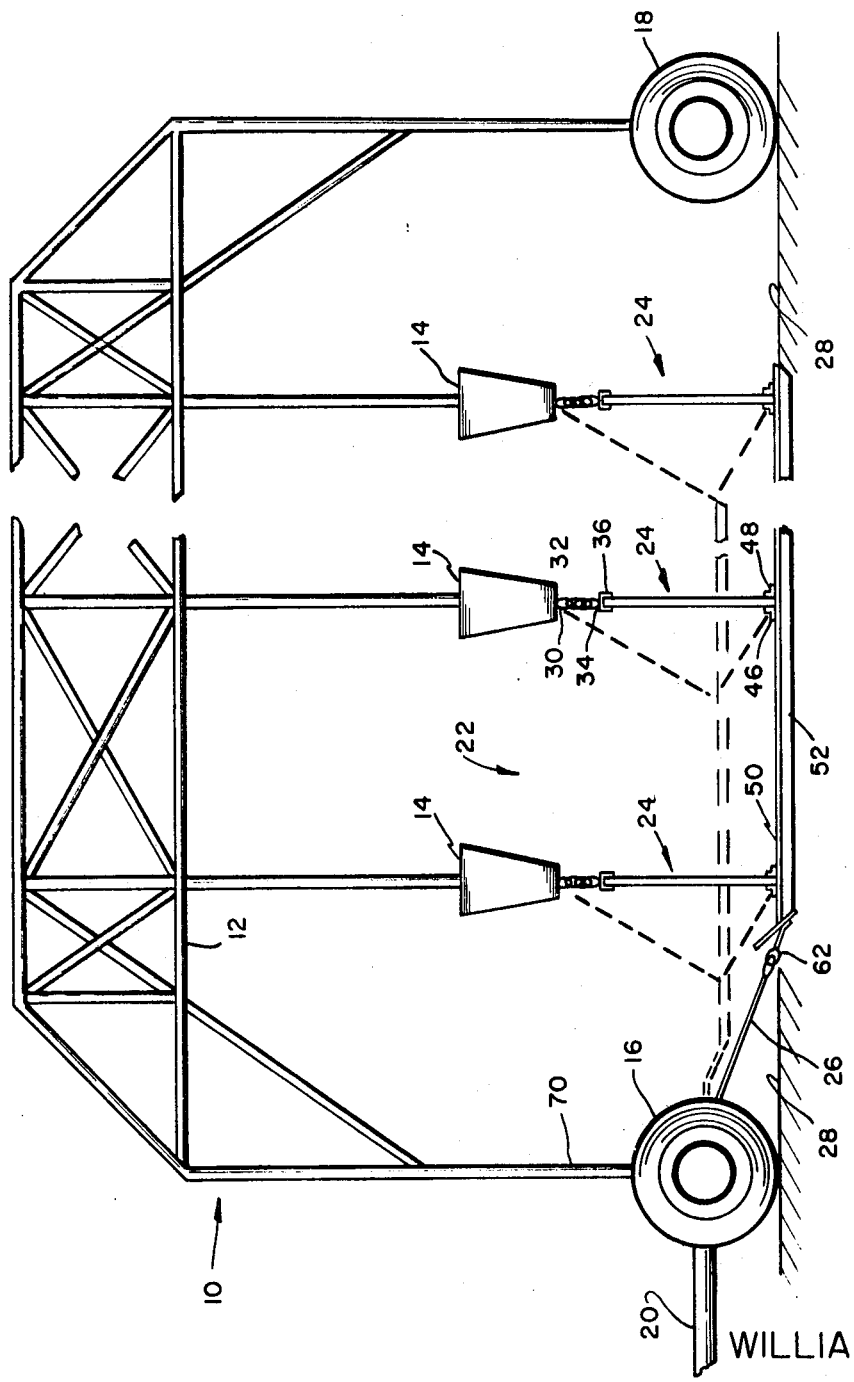
FIG. 1 is a frontal elevational view of typical portions of an example of improved animal-racing start gate apparatus constructed in accordance with the principles of the present invention.

With specific reference now to the separate figures in detail, it is stressed that the particulars shown are by way of example only and for purposes of illustrative example only, and are presented in the cause of providing what is believed to be the most useful and readily understood description of the principles and structural concepts of the invention. In this regard, no attempt is made to show structural details of the apparatus in more detail than is necessary for a fundamental understanding of the invention. The description, taken with the drawing will make it apparent to those skilled in the mechanical and animal racing arts how the several forms of the invention may be embodied in practice. Specifically, in this regard, the detailed showing is not to be taken as a limitation upon the scope of the invention which is defined by the appended claims which are intended to form, along with the drawings, an integral part of this specification.

In FIG. 1, the example of the system shown includes a horserace starting gate 10 having a truss superstructure assembly 12 with a series of, for example 11 or 13, divider structures or pontoons 14 depending therefrom to form a sequence of 12 or 14 stalls extending adjacently to each other from one end of the assembly 12 to the other. Sets of wheels 16, 18 are provided at the forward and rear, respectively, ends of the gate assembly for transporting, as by towing, the gate, longitudinally of itself, away from the racing area when desired. For such purpose a tongue member 20 is affixed to the forward end of the gate 10 as indicated.

The traction mat assembly 22 is suspended from the individual stall pontoons 14 by a series of hanger elements 24 as shown. A retraction cable 26 is affixed to the forward end of the assembly 22 for laterally pulling and consequently lifting the entire assembly clear of the racing surface 28 in a parallelogram swing manner as indicated by the dashed lines.

For a more detailed consideration of this particular example of the traction mat assembly 22, reference is made to FIG. 2. The lower portion of a typical stall-separator pontoon 14 is shown having a series of metal supporting eyes 30, such as those of eyebolts appropriately mounted through the lower surface thereof. From each of the supporting eyes, a length 32 of chain links depend. A like series of supporting eyes 34 is mounted along the top surface of a header member 36. The links of each chain 32 are interconnected in a tension-supporting relation with the eyes 34 by a quick-release rod member 38 having a grasping handle portion 40. In operation, the rod member is inserted into selected links of the respective chains in a manner to provide the desired overall effective length for each hanger assembly 24 to provide for uneven ground or turf. In addition, the rod 38 may be removed, by hand, substantially instantly to aid in freeing a horse or rider entangled in any manner in the stall and thus minimize further the probability of injury to horse or rider.

The header member 36, in this example, is a length of channel metal disposed concave downwardly and into the channel of which is received and secured, as by rivets, the upper ends of one or more, in this example, belting elements 42, 44. In constructed examples of the invention, these elements have typically been fabricated of flexible belting material lengths having dimensions approximately one-eighth inch to one-fourth inch thick, 10 inches wide, and 24 inches long.

The bottom ends of the belting elements 42, 44 are, in this example, secured between a juxtaposed pair of angle metal members 46, 48 as by riveting or bonding means not shown. The members 46, 48 are in turn, typically, riveted to the traction mat body 50.

The mat body 50 is, in a presently preferred configuration, fabricated of synthetic rubber approximately three-fourths inch in thickness, 3 to 4 feet in width and having a length of the order of that of the starting gate assembly 10. The top surface is heavily textured for maximum frictional engagement with the horse's shoes. The undersurface of the mat body may be effectively cleated by channel metal frame assembly members 52, 54 to the upper, convex surface of which the mat body 50 is riveted. Depending upon particular specified requirements and the selection of construction of the body 50, the frame members 52, 54 may not be included. When desired, the longitudinal frame members may be affixed directly to the juxtaposed angle metal members 46, 48.

Referring now to FIG. 3, the above example of a portion of the traction mat assembly is illustrated in which two sets of suspending belting elements 42, 44 and their associated sets of metal members 46, 48 and the rubberlike body 50 are shown mounted over a frame assembly 56 comprising a network of frame members 52' which are hinged, for track contour compliance, at each supporting point by a hinge mechanism 58. At the forward end of the frame assembly, the frame members may be intersecured rigidly by an inclined sled plate element 60 to which may be attached a hitch member 62 for attachment of the retracting cable 26.

Referring to FIG. 4, an example of automatic retraction means is shown schematically. The root of the tongue member 20 is mounted with a longitudinal freedom of sliding or telescoping motion within a hollow tubular metal sleeve member 64. The longitudinal movement is limited, in this example, by a pin element 66 affixed to the tongue member 20 and extending laterally outwardly therefrom through a retaining slot 68 in the tubular sleeve member 64; the length of the slot being typically of the order of 18" thereby permitting a maximum longitudinal displacement of the retraction cable 26, affixed to the tongue 20, of a like magnitude. The tongue-retaining sleeve member 64 is shown hingedly affixed to a forward frame portion 70 of the starting gate assembly 10.

When desired, the forward disposition of the tongue member 20, with respect to the sleeve member 64, may be maintained against the traction mat weight-caused tension in the cable 26 by a locking pin 72 interposed between its retaining aperture in the sleeve member 64 and an aligned aperture in the tongue member 20.

In operation, tension in the tongue member 20, of a magnitude less than that required to overcome the static and rolling friction of the wheels 16, 18 and their associated bearings, causes a parallelogram swing-lifting and ground-clearing movement of the traction mat assembly. Then when the forward travel of the tongue member 20 with respect to the sleeve member 64 is terminated by the pin element 66 contacting the forward end of the slot 68, the tension in the tongue member 20 may be further increased to a magnitude sufficient to overcome the combined static friction effects and result in the towing of the starting gate assembly away from the racing area of the track.

Referring to FIG. 5, an alternative example of the retraction mechanism is shown in which the tongue member 20' is directly hingedly affixed to the frame portion 70; and the retraction cable 26' is affixed to the tension-supporting rod 74 of a hydraulic drive piston 76. The piston is housed within a rigid cylinder 78 affixed hingedly to the frame portion 70. The hydraulic piston-cylinder combination 76, 78 is of the character to move the retraction cable 26' longitudinally to the right, in the figure, when fluid under pressure is applied, in this example, behind the piston at the fluid inlet port 80.

The fluid is pressurized by a pump 82, electrically energized, in this example, by a storage battery 84 when the switch 86 in the leads therebetween is closed. A flexible conduit 88 provides bilateral fluid communication between the cylinder 78 and the pump 82.

In FIG. 6, the schematic presentation illustrates a unitary mat body 90 suspended from each of the stall separator pontoons 92 by a tension-supporting member 94. The terminal one (left-hand end as viewed in the figure) of the supporting members is formed by one arm 96 of an angle lever 98 pivoted at a fulcrum point 100 carried by the lower edge of the terminal pontoon. The other arm 102 of the lever is affixed at its end to a hydraulic actuator 104 supplied by fluid under pressure from a pump mechanism 106.

When the pump 106 is energized, the tip end of the arm 102 of the angle lever 98 is forced upwardly causing the lever to rotate clockwise and the lower end of the arm 96 to travel to the left end upwardly. As indicated by the broken lines in the figure, the pivot action of the ends of the supporting members 94 and the tension-carrying ability of the unitary mat body 90 results in a lifting and ground-clearing action thereof.

This arrangement of the invention exhibits the advantages of providing a wide range of additional mechanical advantage by selection of the relative lever arm 102, 96 lengths and provides clearance of the lifting mechanism from about the wheel assembly 16.

Referring to FIG. 7, an example of the invention is schematically indicated which includes a tension cable 110 which is affixed at one end 112 to the mat body 114, passes over a movable pulley 116, a pair of fixedly mounted pulleys 118, 120, and is affixed to an overhead cable or rod longitudinal actuating member 122. At each stall divider pontoon, a suspension cable 124 is affixed to the overhead actuating member 122 at a junction 126 and passes over a fixedly mounted pulley 128 to an attachment point 130 carried by the mat body 114. A stopping block element 132 mounted on the starting gate frame limits the horizontal displacement action of the mat body. A block-and-tackle arrangement 134 of moving pulleys may be interposed in the linkage of the cable 110 between the mat body 114 and the movable pulley 116 to increase the mechanical advantage in that portion of the lifting system.

In operation, tension force, from, for example, the tongue or a hydraulic actuator, indicated at 136, is applied to the hub of the movable pulley 16. This action results in providing tension in the cable 110 pulling the mat body 114 to the stopping block element 132 and lifting each of the attachment points 130 and, consequently, the mat body 114 as indicated by the broken lines in the figure. In practice it has been found desirable in some applications and under some soil conditions to provide a horizontal motion, breaking action of the mat body from the soil before attempting to lift the mat assembly.

Similarly, in FIG. 8 each of the tension-supporting members 140 between the separating pontoons 142 and respective attachment points 144 on the mat body 146 includes a hydraulic lifting actuator element 148 energized from a pump 150. A horizontal action hydraulic actuator 152 is shown connected between the frame and the end of the mat body 146 to achieve any desired "breaking" action between the soil and the mat body. It may be noted that the diameter of the actuator 152 is greater than that of the lifting actuators whereby the horizontal breaking action will occur first; then the pressure from the pump 150 will build up and operate the actuators 148.

There have thus been disclosed and described a number of examples of various structural aspects of novel race-starting gate apparatus which achieve the objects and exhibit the advantages set forth hereinabove.

I claim:

1. In a starting gate, for racing animals, of the character having a frame including an overhead superstructure from which depend, in a sequence along the length of the gate, and transverse to the track direction a plurality of dividing members defining a sequential plurality of animal-retaining stalls and having supporting wheels for moving the gate, when desired, across the racing surface transverse to said track direction, the combination therewith of retractable starting traction providing apparatus comprising:

traction mat means including a length of heavy rubberlike material disposed over and covering said racing stall surface beneath said plurality of stalls and including traction means disposed on the underside of said mat material and integrally affixed thereto and carried thereby for gripping said racing surface in a lateral, track direction, thrust-supporting relation, said traction means being of the character to yield to thrust in said longitudinal direction, transverse to said track direction;

support means depending substantially vertically and supportingly interconnected between said dividing members and said traction mat means, said support means being of the character to support tension while permitting longitudinal, transverse to said track direction, and lift displacement of said traction mat means with respect to said dividing means; and retraction motive means carried by said starting gate and connected to said traction mat means for achieving said longitudinal and lift displacement thereof, said support and retraction motive means defining as means to achieve primarily the shear, track-contact-breaking longitudinal displacement and secondarily said lift displacement.

2. The invention according to claim 1 in which said traction means comprises a frame assembly affixed reinforcingly to the lower ground-engaging surface of said traction mat.

3. The invention according to claim 2 in which said frame assembly includes flexure means interposed therein contiguously to said vertical support means for permitting said frame assembly and said traction mat to conform to nonflat racing surfaces.

4. The invention according to claim 1 in which said support means comprises flexible belting material interconnected between top header means and said traction mat means.

5. The invention according to claim 4 which includes adjustable length, connector means for interconnecting supportingly said header and one of said dividing members.

6. The invention according to claim 5 in which said connector means includes tension-supporting link chain member and quick-releasable connector pin means mating by engageable therewith.

7. The invention according to claim 1 in which said retraction motive means includes hydraulic pump means and force-producing hydraulic cylinder and piston means coupled thereto and to said traction mat means for achieving said longitudinal and lift displacement thereof upon actuation of said cylinder and piston means.

8. The invention according to claim 1 in which said retraction motive means includes: a tongue member for pulling said starting gate and which includes a forward portion longitudinally movable over a limited range with respect to the remainder of said gate; and cable means connected between said forward portion of said tongue member and said traction apparatus whereby tension in said tongue forward portion causes a like tension in said cable to cause, in turn, said longitudinal and lifting displacement of said traction mat means for the retraction thereof upwardly and away from said racing surface automatically prior to the moving of said starting gate by further tension applied through said tongue member.

9. The invention according to claim 1 in which said retraction motive means comprises: lift action hydraulic actuator interposed in each of said support means; and longitudinal, track-grip-breaking action hydraulic actuator means interconnected between said frame and said traction mat means.

10. The invention according to claim 1 in which said retraction motive means comprises: tension cable means coupled to each of said support means in lift action producing relation therewith and to said mat means in longitudinal breaking action producing relation therewith; and force coupling means connected to said cable means for producing tension therein and for achieving responsive thereto said lift action and said breaking action.